US012289305B1

(12) United States Patent
Best et al.

(10) Patent No.: US 12,289,305 B1
(45) Date of Patent: Apr. 29, 2025

(54) COMPUTER-IMPLEMENTED AUTHENTICATION INTEGRITY CHALLENGE FOR A CLOUD PROVIDER NETWORK

(71) Applicant: Amazon Technologies, Inc., Seattle, WA (US)

(72) Inventors: Christopher Best, New York, NY (US); Benjamin Gordon, Anaheim, CA (US); Nicolas Taing, Oakland, CA (US); Ryan Mark Lacy, Berkeley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 143 days.

(21) Appl. No.: 18/333,204

(22) Filed: Jun. 12, 2023

(51) Int. Cl.
*H04L 9/40* (2022.01)
*H04L 9/32* (2006.01)

(52) U.S. Cl.
CPC ........ *H04L 63/0846* (2013.01); *H04L 9/3271* (2013.01)

(58) Field of Classification Search
CPC ............. H04L 63/0846; H04L 63/1425; H04L 9/3271; H04L 9/3236; H04L 9/3231
See application file for complete search history.

(56) References Cited

U.S. PATENT DOCUMENTS

2006/0126468 A1* 6/2006 McGovern .............. G06F 21/64
369/47.1
2013/0061110 A1* 3/2013 Zvibel ................. G06F 11/1004
714/E11.03
2019/0130114 A1* 5/2019 Smith ..................... G06F 21/10
2021/0105257 A1    4/2021 Crowther
2022/0100372 A1* 3/2022 Lin ........................ G06F 3/0617
2022/0222241 A1* 7/2022 Coffing ................ G06Q 30/012
(Continued)

*Primary Examiner* — Khalid M Almaghayreh
(74) *Attorney, Agent, or Firm* — NICHOLSON DE VOS WEBSTER & ELLIOTT LLP

(57) ABSTRACT

Techniques for providing a computer-implemented authentication integrity challenge (AIC) service are described. According to some examples, a computer-implemented method includes receiving, at a cloud provider network, a first request from an end customer device to log into an end customer account of the cloud provider network; sending, in response to the first request, a second request that does not include login credentials for the end customer account from the cloud provider network to a challenge provider service separate from the cloud provider network for the first request; receiving, by the cloud provider network, a validation indication from the challenge provider service that indicates the second request is validated by an integrity challenge of the challenge provider service; generating, by the cloud provider network, a proof based on the validation indication; sending the proof by the cloud provider network to the end customer device; receiving, by the cloud provider network, a third request from the end customer device that comprises the login credentials and the proof sent by the cloud provider network; and logging the end customer device into the end customer account in response to the proof provided in the third request being validated by the proof generated by the cloud provider network and the login credentials provided in the third request matching corresponding login credentials for the end customer account.

20 Claims, 12 Drawing Sheets

(56) References Cited

U.S. PATENT DOCUMENTS

| | | | |
|---|---|---|---|
| 2022/0318415 A1* | 10/2022 | Fu | H04L 67/1097 |
| 2024/0089098 A1* | 3/2024 | Venkatesan | H04L 9/088 |
| 2024/0114012 A1* | 4/2024 | Venkatesan | H04L 63/105 |
| 2024/0220132 A1* | 7/2024 | Steinmetz | G11C 29/06 |

* cited by examiner

EXAMPLE PROOF (RANDOM 16-CHARACTER TOKEN)
400

L1qlQdB1ki9Elpj8

*FIG. 4*

```
EXAMPLE PAYLOAD
500

{
"ip": "128.128.128.128",
"user-agent": "UserAgent/5.0 (OS 10; 64-bit) WebRenderingEngine/
537.36 (KHTML, like Gecko) Broswer1/109.0.0.0 Broswer2/537.36",
"iat": "2023-01-30T16:10:03.324Z",
"exp": "2023-01-30T17:10:03.324Z"
}
```

```
EXAMPLE PROOF
502 v4.local.UyLfC_qkj0Yevgl29ntOpxQ4871iTjsdlI795Lwfuq58zJ54OA6e7BbAz
_VQIIlb-ceTbrTlET
-
gx6e115lnHd38W6strCYDoceP4ypx_tp7SYwX6s3ugO8jlgL1qlQdB1ki9Elpj8M5
G0krmqjJ5RkdyfbZr
Owh0Rstm43ZIRhA7BeYXprKnArgvZ_gsh6gkxnO2dCtP3o0VYS4KU5uVtn0YZkWRP
sJlI2p0Qw7SMDDC_Ad KhIQjXh1SUERfhSQSh2gv5ixBtU4ZEFvajOgGzig-
sHShaKcRXYiM2NMGh8xS53N29PJWEbL6FZUrPNwPWC
o7iuxXNaMdD04An891X8.eyJraWQiOiJ0b2tlbi1kZXYtMTIzIn0
```

*FIG. 5*

COMPUTER-IMPLEMENTED AUTHENTICATION INTEGRITY CHALLENGE FOR A CLOUD PROVIDER NETWORK

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

FIG. 4 is a diagram illustrating an example proof according to some examples.

FIG. 5 is a diagram illustrating example payload and an example proof based on the payload according to some examples.

DETAILED DESCRIPTION

Figure 1:
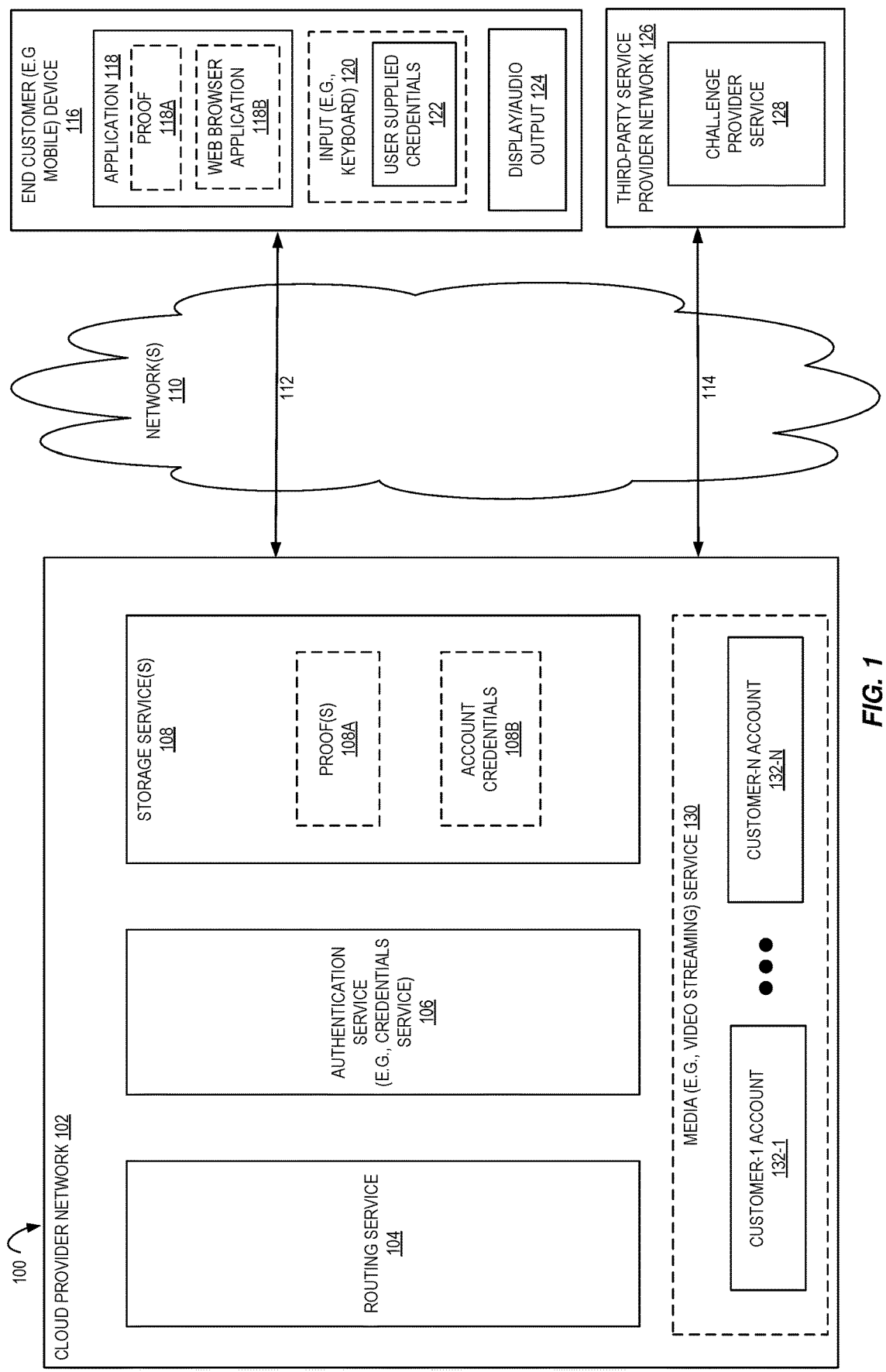
FIG. 1 is a diagram illustrating an environment including a cloud provider network coupled to a third-party network having a challenge provider service according to some examples.

The present disclosure relates to methods, apparatus, systems, and non-transitory computer-readable storage media for performing an authentication integrity challenge. Certain examples herein are directed to an authentication integrity challenge (AIC) mechanism, that mitigates browser-automated and/or crowdsourcing (e.g., Mechanical Turk) based approaches to brute force attacks, utilizing a third-party challenge vendor to issue a challenge separate from an authentication attempt.

Certain authentication attempts (e.g., as part of login operations for an account and/or to create a new account) are protected by a challenge, e.g., protected by a challenge and response authentication where a first party presents a question (e.g., "challenge") and another party is to provide a valid solution (e.g., "answer" or "response") to be authenticated. Example challenges are "Completely Automated Public Turing test to tell Computers and Humans Apart" (CAPTCHA) challenges (e.g., where a challenge, such as a visual puzzle, is used to differentiate between humans versus automated traffic) (e.g., a visual puzzle that includes entering a sequence of letters or numbers seen in a distorted image), cryptographic puzzles, etc.

However, an issue with certain challenges are that the solutions to these challenges may be available to attackers, e.g., where the solutions are collected (e.g., solving a challenge) by ethically gray third-party vendors (e.g., solving and/or bypass services) that then resell challenge solutions to attackers, e.g., to allow the attackers to commit brute force attacks resulting in account takeover and financial fraud. In certain examples, an ethically gray third-party vendor does not commit illegal acts on its own but sells information (e.g., challenge solutions) and/or tools that enable others (e.g., businesses or individuals) to commit illegal acts.

Certain examples herein are directed to using a proof (e.g., an encrypted nonce) to tie a challenge solution to a particular authentication attempt. By separating the challenge operations and authentication (e.g., authentication attempt) operations into two separate parts tied together by this proof (e.g., encrypted nonce), examples herein are able to proxy challenges to a third-party provider network (e.g., external from a cloud provider network that is hosting the account that is to be logged into) (e.g., third-party challenge provider service) without exposing user (e.g., login) credentials and to ensure that the challenge solver is unable to collect (e.g., "farm") and/or sell their solutions to bad actors. In certain examples, the AIC proof (e.g., nonce) can support multiple challenge providers, including internal challenges and external vendors.

In certain examples, an authentication integrity challenge (AIC) mechanism mitigates the secondary market of challenge solvers (e.g., vendors that build tools that circumvent defenses to automate and sell solutions for certain (e.g., common) challenge providers) that enable bad actors to perform brute force attacks with the intention of account takeover and fraud. In certain examples, AIC methods and systems separate an authentication attempt into two separate parts (e.g., steps): (1) an integrity challenge, and (2) an authentication attempt. In certain examples, these steps are tied together by a single-use proof (e.g., token) that ensures the authentication attempt can only be used once and can only be used by the solver of the integrity challenge. This separation allows for the abstraction of a challenge mechanism, allowing internal processes or an external vendor to issue a challenge without having access to the confidential payload of the authentication attempt (e.g., user information, password, etc.).

The technical problems are as follows. Although the digital identity of a user can be verified by certain credentials (e.g., a password), bad actors aiming to falsify their identity and gain access to accounts with monetary value may employ brute force attacks to repeatedly guess those credentials (e.g., passwords). In certain examples, these guesses are tied to and limited by a challenge such as, but not limited to, a CAPTCHA (e.g., solved by a human end customer) or a cryptographic proof of work, for example, a resulting solution to a cryptographic hashing challenge, e.g., solved by the application 118 and/or end customer device 116 (e.g., in contrast to being solved by a human end customer themself). Of growing concern is the proliferation of ethically gray challenge solvers that produce solutions to these challenges en masse and sell the solutions to attackers, e.g., who then execute large-scale automated brute force attacks (e.g., a method of account takeover that employs repeated guesses of a user's credentials). These attackers are then able to gain access to accounts and commit monetary fraud. This account takeover (e.g., malicious access of a victim's account with the intent to commit monetary fraud and/or harassment of community members) related fraud may cost certain providers (e.g., streaming media service providers) millions of dollars per year in revenue losses. While there may be tools for assisting in account takeover-related fraud, such new defenses may rapidly become stale, e.g., within hours or days. To protect against this fraud, it is critical to continuously invest in defenses in a manner that asymmetrically raises costs for attackers. However, certain service providers do not have the engineering capacity or expertise to keep up with the evolving technology of attackers, e.g., the evolving technology of generating challenges and solutions.

The technical solutions to these problems are that authentication integrity challenge (AIC) as disclosed herein allows (e.g., a cloud provider network) for a proxy to a (e.g., any) third-party challenge provider and separates their proof of work from the user authentication process, avoiding the exposure of sensitive user credentials (e.g., username, password, account identification, and/or phone number). Turning now to the figures, FIG. 1 is a diagram illustrating an environment 100 including a cloud provider network 102 coupled to a third-party network 126 having a challenge provider service 128 according to some examples.

Cloud provider network 102 may include one or more customer accounts, e.g., customer account 132-1 for a first customer (e.g., end customer) and customer cloud 132-N (where N is a positive integer greater than one) for one or more additional customers (e.g., end customers). As one non-limiting example, the cloud provider network may implement a media (e.g., video streaming) service 130, e.g., that includes a video encoder to encode video to be sent to end customer device 116 for viewing on display 124 and/or an audio encoder to encode (e.g., corresponding) audio to be sent to end customer device 116 for listening on audio output 124. In certain examples, each customer account 132-1 to 132-N is for a particular account, e.g., such that the end customer (e.g., via end customer device 116) can provide content to media (e.g., video streaming) service 130, e.g., which may then be send to one or more subscribers of that end customer. In certain examples, the content may include esports tournaments, personal streams of individual players, and/or gaming-related talk shows. The content may include one or more feeds (e.g., live streams), for example, on-demand video/audio and/or linear television (TV) (e.g., that can be viewed according to a set schedule, e.g., not on demand).

In certain examples, end customer device 116 (e.g., computing device, such as, but not limited to, table, laptop computer, desktop computer, smartphone, etc.) and/or application 118 is to send a request (e.g., via connection 112) to cloud provider network 102 to access a (e.g., only one of) customer account 132 (e.g., a request to log into an existing customer account and/or create a customer account). In certain examples, this (e.g., access) request includes user credentials (e.g., user supplied credentials 122), e.g., sensitive user credentials (e.g., username, password, account identification, and/or phone number), that are preferred not to be sent to a (e.g., third-party) challenge provider service 128 and/or third-party service provider network 126, but it is desirable to perform a challenge, e.g., for a particular user (e.g., end customer device 116 and/or application 118). In certain examples, the cloud provider network 102 (e.g., routing service 104) is to remove the (e.g., sensitive) user credentials (or other private information) from the (e.g., access) request, e.g., but does not remove other user related metadata, e.g., an Internet Protocol (IP) address and/or a user agent header (e.g., of the end customer application).

In certain examples, the (e.g., access) request does not includes sensitive user credentials (e.g., username, password, account identification, and/or phone number), but it is desirable to perform a challenge, e.g., for a particular user (e.g., end customer device 116 and/or application 118).

In certain examples, a challenge request for the (e.g., access) request is sent (for example, via connection 114, e.g., separate from connection 112) by the cloud provider network 102 (e.g., routing service 104) to challenge provider service 128 (e.g., implemented by a third-party service provider network 126), e.g., a challenge request that does not include sensitive user credentials (e.g., username, password, account identification, and/or phone number).

In certain examples, the challenge provider service 128 (e.g., implemented by a third-party service provider network 126) is to generate a challenge, send it to the end customer device 116 and/or application 118 to receive an end customer provided solution, check that end customer provided solution against the actual solution, and send a validation indication (e.g., if the end customer provided solution is validated by (e.g., matches) (e.g., within an allowable threshold of) the actual solution) and/or send an invalidation indication (e.g., if the end customer provided solution is not validated by (e.g., does not match) (e.g., is not within an allowable threshold of) the actual solution) to the cloud provider network 102 (e.g., routing service 104).

In certain examples, the challenge is sent to the cloud provider network 102 (e.g., routing service 104) and, in response, it sends (e.g., forwards) the challenge to the end customer device 116 and/or application 118.

In certain examples, the end customer device 116 and/or application 118 is to send an end customer provided solution to the challenge provider service 128, for example, via the cloud provider network 102 (e.g., routing service 104).

In certain examples, no request(s) and/or no response(s) are allowed directly between the end customer device 116 and the challenge provider service 128 (e.g., implemented by a third-party service provider network 126). In certain examples, no request(s) and/or no response(s) are allowed directly between the application 118 and the challenge provider service 128 (e.g., implemented by a third-party service provider network 126).

In certain examples, the challenge provider service 128 (e.g., implemented by a third-party service provider network 126) is to check the end customer provided solution against the actual solution, and send a validation indication to the provider network 102 (e.g., to routing service 104) (e.g., if the end customer provided solution is validated by (e.g., matches) (e.g., within an allowable threshold of) the actual solution) and/or send an invalidation indication to the provider network 102 (e.g., via routing service 104) (e.g., if the end customer provided solution is not validated by (e.g., does not match) (e.g., is not within an allowable threshold of) the actual solution) to the cloud provider network 102 (e.g., to routing service 104). In certain examples, validation includes checking (e.g., confirming) that the proof 118A (e.g., nonce) sent by device 116 and/or application 118 exists in the cloud provider network 102 (e.g., in storage service 108), for example, that the proof 118A (e.g., nonce) sent by device 116 and/or application 118 is one of a plurality of generated proofs 108A (e.g., nonces) that exists in the storage service 108. In certain examples, validation includes checking if the existing proof (e.g., nonce) in the storage service 108 has not been used yet for a validation. In certain examples, validation includes checking if metadata content of the payload (e.g., sent from cloud provider network 102 to device 116 and/or application 118 in first AIC step 200-1 in FIGS. 2-3) matches the metadata content of the secondary request (e.g., sent from device 116 and/or application 118 to cloud provider network 102 in second AIC step 200-2 in FIGS. 2-3).

In certain examples, the first part of the operations are completed in response to a validation indication (e.g., a correct solution), and then the cloud provider network 102 (e.g., authentication service 106) is allowed to proceed with the second part of the operations, e.g., a login request (e.g., or an account creation request), e.g., based on the user supplied credentials 122 matching the corresponding account credentials 108B of the provider network 102 (e.g., in storage services 108 thereof).

In certain examples, an invalidation indication (e.g., an incorrect solution) causes the cloud provider network 102 to prevent proceeding with the second part of the operations, e.g., prevent a login request (e.g., or an account creation request) from being serviced (e.g., preventing servicing by authentication service 106).

In certain examples, device 116 includes an input 120 (e.g., keyboard, microphone, (e.g., video and/or still) camera, etc.), e.g., to input user supplied credentials and/or media to be streamed by media service 130. In certain examples, device 116 includes a display/audio output 124, e.g., to view content from media service 130 and/or challenger provider service 128.

In certain examples, application 118 is a web browser application 118B, e.g., that an end customer is using to attempt to login (e.g., access) a customer account 132.

As discussed above, in certain examples it is desirable to raise the cost of utilizing a challenge, e.g., to decrease the likelihood that a valid solution is for a challenge actually provided to the particular end customer device 116 and/or application 118, e.g., and not merely a solution that while valid, was obtained in a nefarious and/or ethically gray manner.

Examples herein are directed to a cloud provider network 102 that utilizes the authentication integrity challenge (AIC) mechanism(s) disclosed herein allows, e.g., such that the cloud provider network is a proxy to a (e.g., any) third-party challenge provider and/or separates their proof (e.g., proof of work) 108A from the user authentication process, avoiding the exposure of sensitive user credentials (e.g., username, password, account identification, and/or phone number). In certain examples, challenges (e.g., must) asymmetrically incur cost to solve versus generate. In certain examples, trapdoor functions (for example, a cryptographic function that is relatively easy to compute in one direction, but difficult to compute in the other direction, e.g., where an input value can be (e.g., easily) hashed into a new value, but that new value cannot, or is difficult to, be reversed to its original value) are employed to make it relatively easy to compute in one direction, but not in reverse. In certain examples, a challenge is in the form of a CAPTCHA, cryptographic proofs of work, or pre-computed puzzles.

To further raise costs for attacks, certain challenges also employ a form of client interrogation (e.g., the process in which a browser or mobile device (e.g., employing telemetry) is to detect automation or repeat requests) to determine and add exponential costs to repeat requests. In certain examples, this client interrogation uses certain (e.g., JavaScript) libraries installed on client-side and an in-depth inspection of requests. In certain examples, this request inspection uses a proxy architecture for third-party (e.g., third-party from the cloud provider network) providers to inspect requests for evidence of duplication or automation.

One or more of storage services 106, computing services, content delivery services (e.g., media (e.g., video streaming) service 130), or other services (e.g., routing service 104 and/or authentication service 106) may be implemented within cloud (e.g., multiple tenant) provider network. Each customer cloud may include one or more storage services (e.g., a particular storage service(s) for a particular customer cloud) and/or one or more computing services (e.g., a particular computing service(s) for a particular customer cloud). Each of the services (e.g., routing service 104, authentication service 106, storage service 108, and/or media service 130) may be implemented via software, hardware, or a combination of both, and/or may be implemented in a distributed manner using multiple different computing devices.

In certain examples, provider network 102 ("cloud" provider network) provides users (e.g., end customer via device 116 with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a computing service), a storage service 108 that can store data objects, etc. The users (or "customers") of provider network 102 may utilize one or more user accounts that are associated with a customer account, though these terms may be used somewhat interchangeably depending upon the context of use. Users may interact with a provider network 102 across one or more intermediate networks 110 (e.g., the Internet) via one or more interface(s), such as through use of application programming interface (API) calls, via a console implemented as a website or application, etc. The interface(s) may be part of, or serve as a front-end to, a control plane of the provider network 102 that includes "backend" services supporting and enabling the services that may be more directly offered to customers.

For example, a cloud provider network 102 may refer to a large pool of accessible virtualized computing resources (such as compute, storage, and networking resources, applications, and services), e.g., a cloud for each customer. A customer cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 102 may rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various examples, a "serverless" function may include code provided by a user or other entity—such as the provider network itself—that can be executed on demand. Serverless functions may be maintained within provider network 102 by an on-demand code execution service (which may be one of compute service(s)) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions (e.g., as an application 1040B) that can be executed on demand, without requiring the user to maintain dedicated infrastructure to execute the serverless function. Instead, the serverless functions can be executed on demand using resources maintained by the provider network 102. In some examples, these resources may be maintained in a "ready" state (e.g., having a pre-initialized runtime environment configured to execute the serverless functions), allowing the serverless functions to be executed in near real-time.

Two-Step Authentication Using AIC Proof (e.g., Token)

In certain examples, a proof (e.g., proof 108A) is generated for a particular challenge instance (e.g., for a particular access request from device 116 and/or application 118), e.g., such that the proof (e.g., based on the challenge and/or its validation) that is generated by the cloud provider network 102, and provided to device 116 and/or application 118, is validated by a proof (e.g., proof 118A) sent along with the access request. In certain examples, if the proof 118A sent by device 116 and/or application 118 is validated by the corresponding proof 108A in cloud provider network during the first step (1), then the access request is to proceed to an authentication check (2), e.g., to check that user supplied credentials 122 match the corresponding account credentials 108B in the provider network.

In certain examples, AIC separates the (1) "challenge mechanism" step from the (2) "authentication attempt" step by introducing a proof (e.g., state token) as an intermediate between the two requests. In certain examples, this proof (e.g., token) is generated after a successful solving of a challenge and consumed with the subsequent authentication attempt (e.g., pass and/or fail).

In certain examples, to prevent replay attacks (e.g., a method of bypassing software defenses by re-using a previously known solution to a challenge), this proof (e.g., token) is treated as a nonce, e.g., backed by a layer of persistent storage. In certain examples, the verification of the proof (e.g., nonce) achieves strong consistency through an atomic "read and delete" operation.

Figure 2:
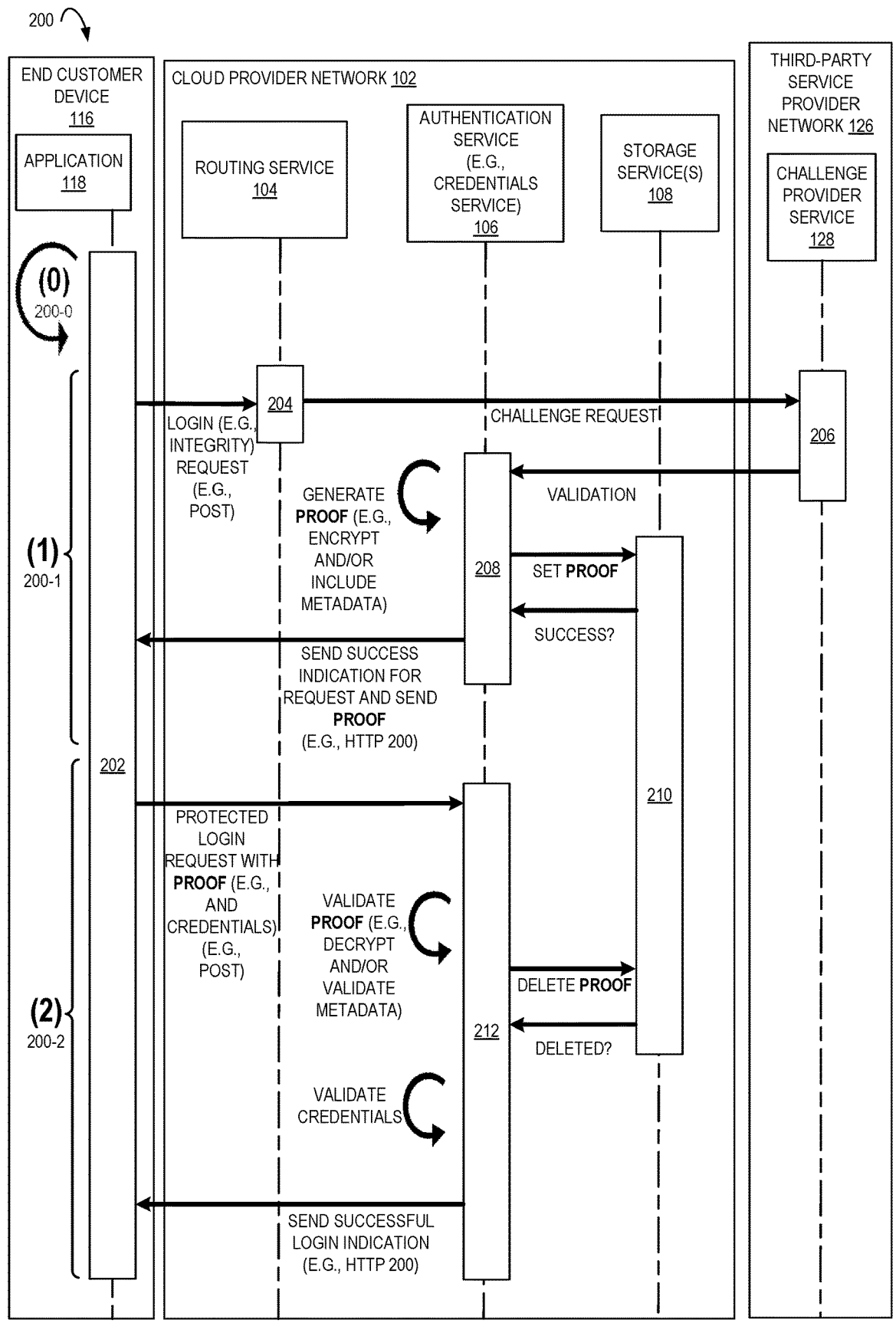
FIG. 2 is a swimlane diagram illustrating a two-step operation for an end customer to login (or signup) into an end customer account of a cloud provider network coupled to a third-party network having a challenge provider service according to some examples.

FIG. 2 is a swimlane diagram 200 illustrating a two-step operation for an end customer (e.g., device 116 and/or application 118) to login (or signup) into an end customer account of a cloud provider network 102 coupled to a third-party network 126 having a challenge provider service 128 according to some examples.

In certain examples, operations include an initial step (0) 200-0 where a user initiates an access request, e.g., as a "client interrogation" to collect (e.g., telemetry) data around the end user (e.g., client). In certain examples, this data is to be sent to the third-party network 126 (e.g., challenge provider service 128).

In certain examples, a first AIC step (1) 200-1 includes a "challenge mechanism", e.g., a (e.g., HTTP POST) request for integrity. In certain examples, this request is proxied to a third-party challenge provider service 128. In certain examples, this request results in a proof (e.g., AIC token). In certain examples, this request results in a validation, and that validation triggers a proof to be generated for that request, e.g., for the particular end customer (e.g., device 116 and/or application 118). In certain examples, this proof is stored in storage services 108 and returned to the end user (e.g., client), e.g., to the end customer (e.g., device 116 and/or application 118).

In certain examples, a second AIC step (2) 200-2 includes an "authentication attempt" of a (e.g., POST) request to a protected login. In certain examples, this request includes user credentials and a proof (AIC token). In certain examples, the nonce characteristic of the proof is validated by an atomic delete in storage services 108. In certain examples, the authentication attempt is validated against stored user credentials in storage services 108.

More particularly, in certain examples, at block 202, end customer (e.g., device 116 and/or application 118) is to send a login (e.g., integrity) request to cloud provider network 102. e.g., routing service 104 thereof. In certain examples, at block 202, the login (e.g., integrity) request is stripped of sensitive information, e.g., sensitive user credentials (e.g., username, password, account identification, and/or phone number). In certain examples, at block 202, the (e.g., removed of sensitive information) login request is sent to cloud provider network 102, e.g., routing service 104 thereof.

In certain examples, first AIC step (1) 200-1 includes the cloud provider network 102 (e.g., routing service 104 thereof) receiving, at block 204, the login request (e.g., integrity portion of the multiple-step login request), and, in response, sending a request for generation of a challenge (e.g., challenge and solution operation) (e.g., via third-party network 126) to challenge provider service 128. In certain examples, at block 206, challenge provider service 128 is to perform the challenge and solution operations, and assuming a correct solution, is to send (e.g., via third-party network 126) a validation to cloud provider network 102 (e.g., authentication service 106 thereof).

In certain examples, first AIC step (1) 200-1 further includes, at block 208, (assuming a correct challenge solution, see, e.g., FIG. 3) receiving at cloud provider network 102 (e.g., authentication service 106 thereof) the validation sent from challenge provider service 128 (e.g., via third-party network 126). In certain examples, at block 208, the cloud provider network 102 (e.g., authentication service 106 thereof) is to generate a proof, e.g., a proof based on metadata (e.g., and not the account (e.g., login) credentials) of the end customer (e.g., device 116 and/or application 118)). In certain examples, this proof is encrypted, e.g., with a private key that is not shared with end customer (e.g., not shared with device 116 and/or application 118) and/or otherwise. In certain examples, at block 210, this (e.g., encrypted) proof is stored in cloud provider network 102, e.g., storage service 108 thereof. In certain examples, at block 210, a success indication is sent from storage service 108 to authentication service 106, e.g., and, at block 208, cloud provider network 102 (e.g., authentication service 106 thereof) is to send a success indication (for example, indicating the challenge was solved successfully, e.g., completed) and/or the (e.g., encrypted) proof to the end customer (e.g., device 116 and/or application 118).

In certain examples, the end customer (e.g., device 116 and/or application 118) is to, at block 202, send a (e.g., protected) login request that includes a proof (e.g., proof 118A in FIG. 1) (e.g., proof 118A and user credentials 122 in FIG. 1) to the cloud provider network 102 (e.g., authentication service 106 thereof), e.g., where this sending is in response to the end customer (e.g., device 116 and/or application 118) receiving the success indication (e.g., indicating the challenge was solved successfully) and/or the (e.g., encrypted) proof.

In certain examples, second AIC step (1) 200-2 includes the cloud provider network 102 (e.g., authentication service 106 thereof) receiving, at block 212, the login request (e.g., the logging in portion of the multiple step login request), and, in response, checking the received proof (e.g., proof 118A in FIG. 1) from the request with a stored proof (e.g., from storage service 108 at block 210) (e.g., proof 108A in FIG. 1), and if it is validated (e.g., matches), then checking the received user credentials (e.g., user supplied account credentials 122 in FIG. 1) from the request with stored user credentials (e.g., retrieved from storage service 108 at block 212) (e.g., account credentials 108B in FIG. 1), and if it is validated (e.g., matches), then allowing a login, e.g., and sending, at block 212, an indication of successful login (e.g., HTTP 200) to end customer (e.g., device 116 and/or application 118). In certain examples, the validation of the proof includes decrypting the received proof (e.g., proof 118A in FIG. 1) from the request with a corresponding stored key (e.g., retrieved from storage service 108 at block 210). In certain examples, the login request (e.g., the logging in portion of the multiple step login request) causes, at block 212, a request to delete the corresponding stored proof (e.g., proof 108A in FIG. 1) to be sent to the corresponding storage of cloud provider network 102 (e.g., storage service 108 thereof). In certain examples, the storage service 108 is to delete the proof, and send a corresponding indication of deletion to the authentication service 106. In certain examples, the (e.g., not used for a validation) stored proof (e.g., proof 108A in FIG. 1) is to be deleted by the cloud provider network 102 on expiration of a time out threshold, e.g., a certain number of minutes (e.g., 15 minutes).

In certain examples, a failure of validation causes the entire login request to stop, e.g., login is blocked (e.g., for that particular request). In certain examples, a failure to validate the received proof (e.g., proof 118A in FIG. 1) from the request with a stored proof (e.g., from storage service 108 at block 210) in the cloud provider network 102 causes the login process to stop, for example, the credentials and/or proof (e.g., proof 118A in FIG. 1) are cleared from the request and/or end customer (e.g., device 116 and/or application 118), e.g., so that any additional request will start over again at 200-0 or 200-1.

Figure 3:
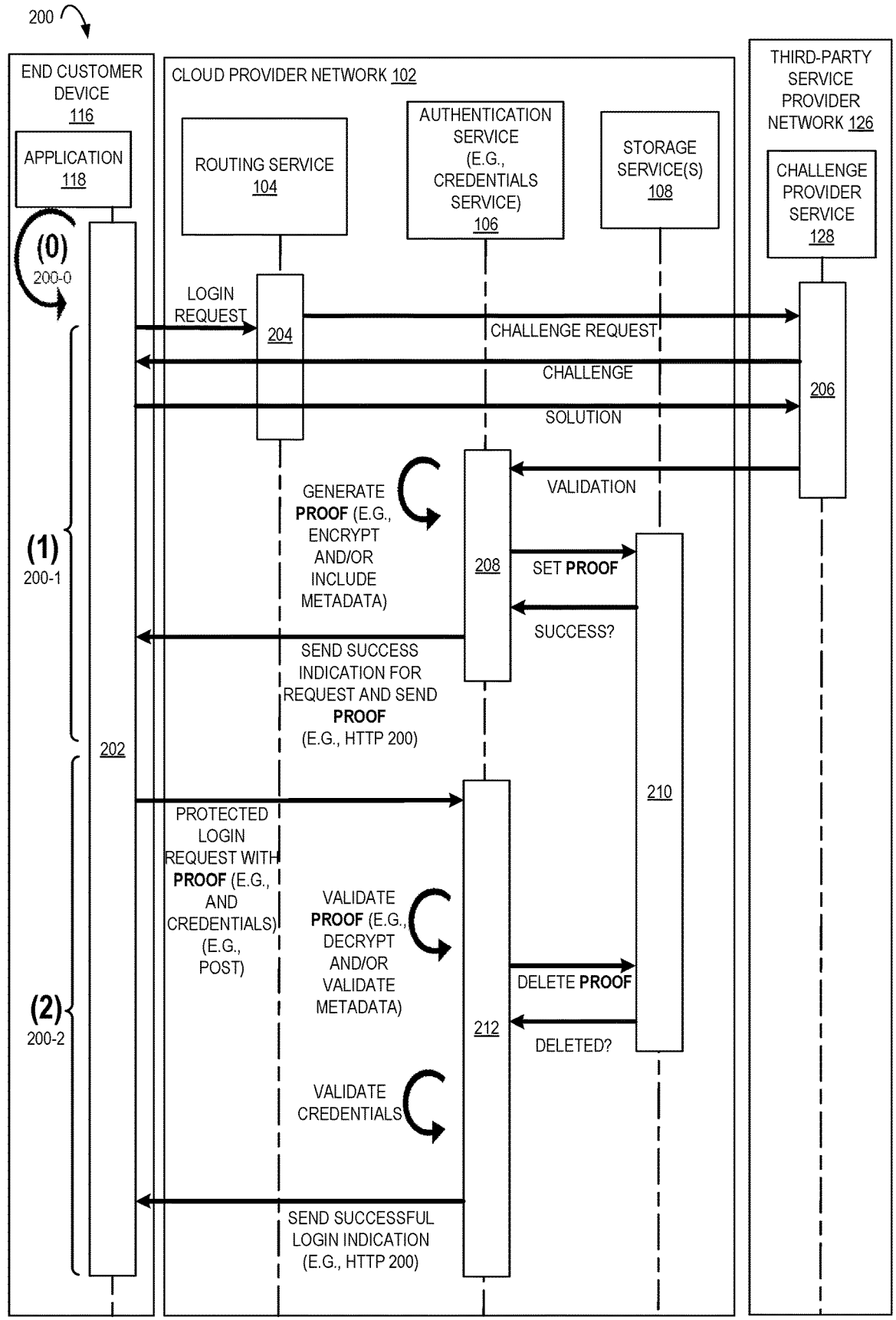
FIG. 3 is the swimlane diagram of FIG. 2 further illustrating the sending of a challenge to an end customer and receiving of a solution from the end customer by a cloud provider network coupled to a third-party network having a challenge provider service according to some examples.

FIG. 3 is the swimlane diagram of FIG. 2 further illustrating the sending of a challenge to an end customer and receiving of a solution from the end customer by a cloud provider network coupled to a third-party network having a challenge provider service according to some examples. FIG. 3 illustrates, at block 206, the challenge provider service 128 sending a challenge to the end customer (e.g., device 116 and/or application 118), for example, via cloud provider network 102 (e.g., routing service 104 thereof), the end customer (e.g., device 116 and/or application 118) sending a potential solution, and (if successfully solved), sending the validation indication. In other examples, different workflows of sending a challenge and solutions are possible.

Two example categories of proofs (e.g., as a nonce) discussed below (1) a relatively simple nonce (e.g., not based on the particular end customer (e.g., device 116 and/or application 118) and/or request, and (2) a Private Platform Agnostic Security Token (PASETO).

FIG. 4 in an example of the (1) a relatively simple nonce type of proof. FIG. 4 is a diagram illustrating an example proof 400 according to some examples. In certain examples, proof 400 is a random (e.g., 16-character) string, for example, treated as a nonce by a persistent backend (e.g., of cloud provider network).

FIG. 5 is an example of the (2) a Private Platform Agnostic Security Token (PASETO) type of proof. FIG. 5 is a diagram illustrating example payload 500 and an example proof 502 based on the payload according to some examples.

In certain examples, PASETO can either be encrypted with a private key or signed and validated using a private/public key pair. Certain examples herein use encryption with a private key.

In certain examples, a proof (e.g., as a token) is a PASETO (e.g., where this version of the token is self-contained and encrypted) includes data that ties a challenge solution to the subsequent authentication attempt. In certain examples, the proof is based on (or includes) the data from the end customer (e.g., device and/or application). In certain examples, this data is metadata from the end customer (e.g., device and/or application), for example, from their corresponding login request, e.g., as payload 500. In certain examples, the metadata contained in this token (e.g., IP address, user agent header, issued at (iat) time, and/or expires at (exp) time) protects against challenge solving by third parties (e.g., farms). In certain examples, the data in this token is encrypted (e.g., as encrypted proof 502) and decrypted using a private (e.g., to the cloud provider network) key, e.g., obscuring the implementation to attackers. In certain examples, proof 502 (e.g., token) is treated as a nonce by a persistent backend (e.g., of cloud provider network).

Figure 6:
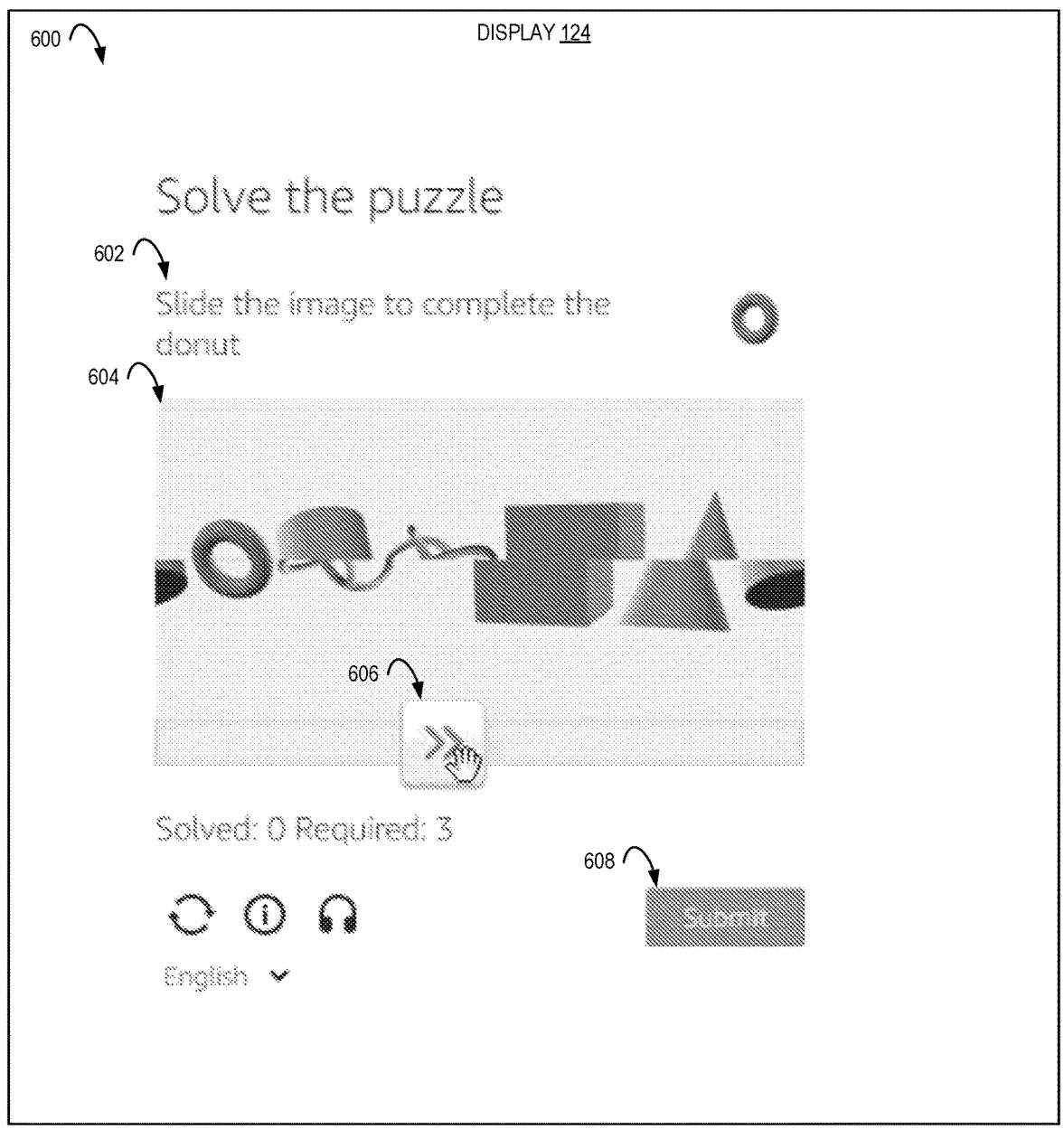
FIG. 6 is a diagram illustrating an example challenge according to some examples.

FIG. 6 is a diagram illustrating an example challenge 600 according to some examples. In certain examples, depicted challenge 600 is presented to end customer (e.g., device and/or application), e.g., via display 124 in FIG. 1. In certain examples, the challenge is sent by a third-party challenge provider service 128. In certain examples, the challenge 600 is a visual puzzle 604 and includes text 602 for the action required for a solution (shown here as a slider 606 interface element), and includes a submit interface element 608, e.g., to send the proposed solution (e.g., an opaque string used as a key to be validated on the backend) to the challenge provider service 128 for validation.

In certain examples, audio challenges are utilized.

In certain examples, a challenge is a cryptographic proof of work, for example, a resulting solution to a cryptographic hashing challenge, e.g., solved by the application 118 and/or end customer device 116 (e.g., in contrast to a visual and/or audio challenge that is solved by a human end customer themself). In certain examples, the challenge is not visible to the user (e.g., end customer). In certain examples, the challenge includes an application 118 and/or end customer device 116 being given a seed and result, and challenged to determine the secret (e.g., via a hashing function). In certain examples, the hashing function {hash (input)} is "hash (seed+secret)=result", e.g., where the input to the hashing function is to consistently produce the same result, but it is difficult/not possible to reverse the result back into the seed+secret. In certain examples, the application 118 and/or end customer device 116 guesses "secrets" in a loop until it correctly hashes into the target result. In certain examples, a cryptographic challenge includes, for a given seed and answer, an application 118 (e.g., web browser application 118B) and/or end customer device 116 is to complete the cryptographic hashing problem by generating numbers, combining them with the seed and performing a hash function, which may occur in a loop. In certain examples, if the application 118 (e.g., web browser application 118B) and/or end customer device 116 finds the number (e.g., solution) that, when combined with the seed, produces the same hash, the challenge was successful and the login process is allowed to proceed (e.g., credentials can then be validated). In certain examples, the solution is an opaque string used as a key to be validated on the backend.

Figure 7:
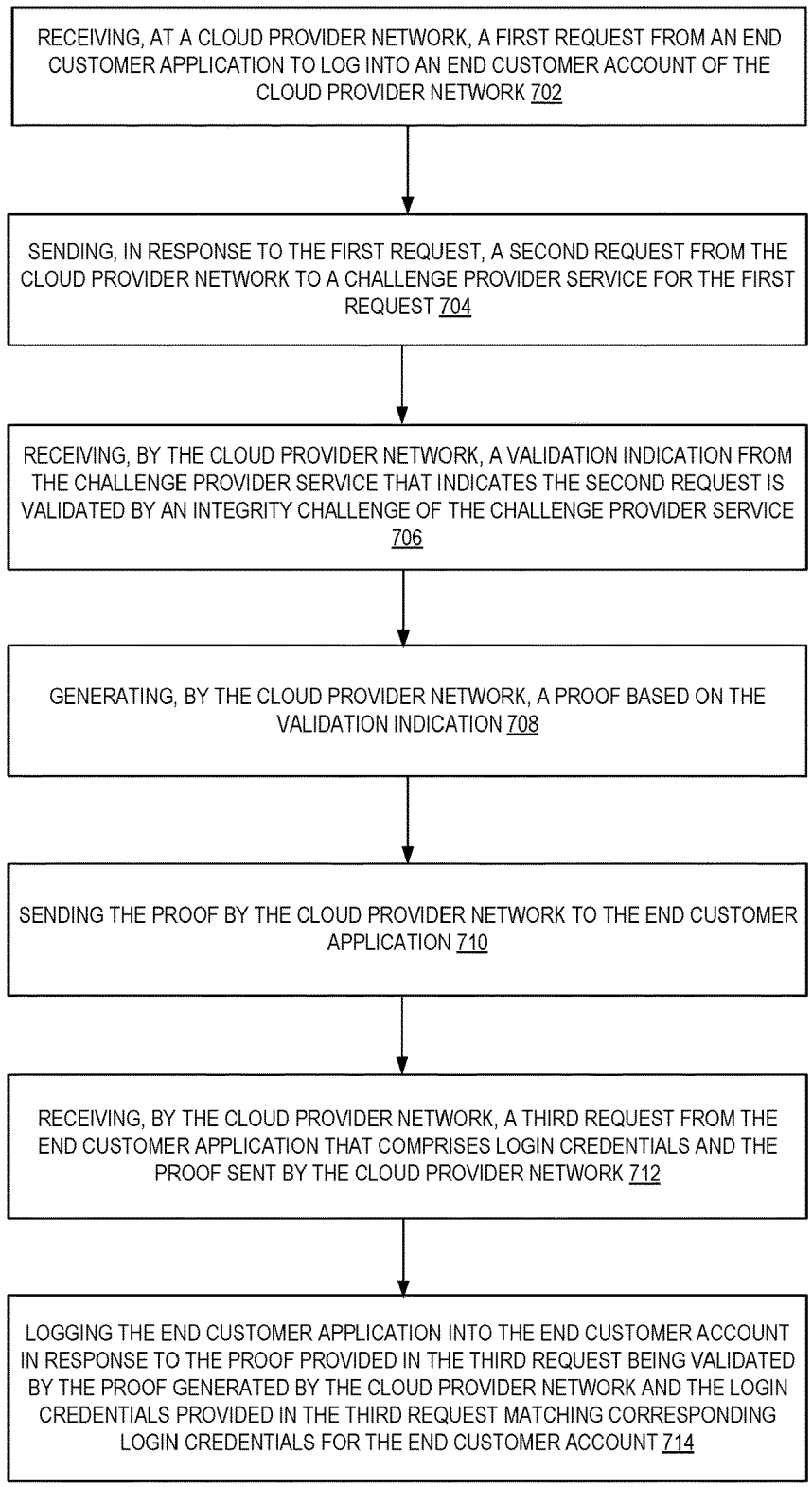
FIG. 7 is a flow diagram illustrating operations of a method for performing an authentication integrity challenge by a cloud provider network according to some examples.

FIG. 7 is a flow diagram illustrating operations 700 of a method for performing an authentication integrity challenge by a cloud provider network according to some examples. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code may be stored on a computer-readable storage medium, for example, in the form of a computer program comprising instructions executable by one or more processors. The computer-readable storage medium is non-transitory. In some examples, one or more (or all) of the operations 700 are performed by cloud provider network 102 (e.g., system/service) (or a component thereof) of the other figures.

The operations 700 include, at block 702, receiving, at a cloud provider network, a first request from an end customer application to log into an end customer account of the cloud provider network. The operations 700 further include, at block 704, sending, in response to the first request, a second request from the cloud provider network to a challenge provider service for the first request. The operations 700 further include, at block 706, receiving, by the cloud provider network, a validation indication from the challenge provider service that indicates the second request is validated by an integrity challenge of the challenge provider service. The operations 700 further include, at block 708, generating, by the cloud provider network, a proof based on the validation indication. The operations 700 further include, at block 710, sending the proof by the cloud provider network to the end customer application. The operations 700 further include, at block 712, receiving, by the cloud provider network, a third request from the end customer application that comprises login credentials and the proof sent by the cloud provider network. The operations 700 further include, at block 714, logging the end customer application into the end customer account in response to the proof provided in the third request being validated by the proof generated by the cloud provider network and the login credentials provided in the third request matching corresponding login credentials for the end customer account.

At least some examples of the disclosed technologies can be described in view of the following examples:

Example 1. A computer-implemented method comprising:
  receiving, at a cloud provider network, a first request from an end customer device to log into an end customer account of the cloud provider network;

sending, in response to the first request, a second request that does not include login credentials for the end customer account from the cloud provider network to a challenge provider service separate from the cloud provider network for the first request;

receiving, by the cloud provider network, a validation indication from the challenge provider service that indicates the second request is validated by an integrity challenge of the challenge provider service;

generating, by the cloud provider network, a proof based on the validation indication;

sending the proof by the cloud provider network to the end customer device;

receiving, by the cloud provider network, a third request from the end customer device that comprises the login credentials and the proof sent by the cloud provider network; and logging the end customer device into the end customer account in response to the proof provided in the third request being validated by the proof generated by the cloud provider network and the login credentials provided in the third request matching corresponding login credentials for the end customer account.

Example 2. The computer-implemented method of example 1, further comprising deleting the proof from the cloud provider network in response to the proof provided in the third request being validated by the proof generated by the cloud provider network and not being validated by the proof generated by the cloud provider network.

Example 3. The computer-implemented method of example 1, wherein the generating, by the cloud provider network, the proof comprises including metadata from the end customer device in the proof, and the logging the end customer device into the end customer account is further in response to the metadata provided in the third request matching the metadata from the end customer device.

Example 4. A computer-implemented method comprising:
receiving, at a cloud provider network, a first request from an end customer application to log into an end customer account of the cloud provider network;

sending, in response to the first request, a second request from the cloud provider network to a challenge provider service for the first request;

receiving, by the cloud provider network, a validation indication from the challenge provider service that indicates the second request is validated by an integrity challenge of the challenge provider service;

generating, by the cloud provider network, a proof based on the validation indication;

sending the proof by the cloud provider network to the end customer application;

receiving, by the cloud provider network, a third request from the end customer application that comprises login credentials and the proof sent by the cloud provider network; and logging the end customer application into the end customer account in response to the proof provided in the third request being validated by the proof generated by the cloud provider network and the login credentials provided in the third request matching corresponding login credentials for the end customer account.

Example 5. The computer-implemented method of example 4, further comprising deleting the proof from the cloud provider network in response to the proof provided in the third request being validated by the proof generated by the cloud provider network.

Example 6. The computer-implemented method of example 5, further comprising deleting the proof from the cloud provider network in response to the proof provided in the third request not being validated by the proof generated by the cloud provider network.

Example 7. The computer-implemented method of example 4, further comprising deleting the proof from the cloud provider network in response to the proof provided in the third request not being validated by the proof generated by the cloud provider network.

Example 8. The computer-implemented method of example 4, wherein the generating, by the cloud provider network, the proof comprises including metadata from the end customer application in the proof, and the logging the end customer application into the end customer account is further in response to the metadata provided in the third request matching the metadata from the end customer application.

Example 9. The computer-implemented method of example 8, wherein the metadata comprises an Internet Protocol (IP) address of the end customer application.

Example 10. The computer-implemented method of example 9, wherein the metadata further comprises a user agent header of the end customer application.

Example 11. The computer-implemented method of example 8, wherein the metadata comprises a user agent header of the end customer application.

Example 12. The computer-implemented method of example 8, wherein the metadata comprises an expiration attribute and an issued-at time attribute for the first request from the end customer application.

Example 13. The computer-implemented method of example 4, further comprising encrypting the proof with a private key of the cloud provider network to generate an encrypted proof, wherein the sending the proof by the cloud provider network to the end customer application is sending the encrypted proof.

Example 14. The computer-implemented method of example 13, further comprising decrypting the encrypted proof of the third request by the cloud provider network to generate a decrypted proof, wherein the logging the end customer application into the end customer account is in response to the decrypted proof from the third request being validated by the proof generated by the cloud provider network.

Example 15. A non-transitory computer-readable medium storing code that, when executed by a device, causes the device to perform a method comprising:
receiving, at a cloud provider network, a first request from an end customer application to log into an end customer account of the cloud provider network;

sending, in response to the first request, a second request from the cloud provider network to a challenge provider service for the first request;

receiving, by the cloud provider network, a validation indication from the challenge provider service that indicates the second request is validated by an integrity challenge of the challenge provider service;

generating, by the cloud provider network, a proof based on the validation indication;

sending the proof by the cloud provider network to the end customer application;

receiving, by the cloud provider network, a third request from the end customer application that comprises login credentials and the proof sent by the cloud provider network; and logging the end customer application into the end customer account in response to the proof provided in the third request being validated by the proof generated by the cloud provider network and the login credentials provided in the third request matching corresponding login credentials for the end customer account.

Example 16. The non-transitory computer-readable medium of example 15, wherein the method further comprises deleting the proof from the cloud provider network in response to the proof provided in the third request being validated by the proof generated by the cloud provider network.

Example 17. The non-transitory computer-readable medium of example 16, wherein the method further comprises deleting the proof from the cloud provider network in response to the proof provided in the third request not being validated by the proof generated by the cloud provider network.

Example 18. The non-transitory computer-readable medium of example 15, wherein the generating, by the cloud provider network, the proof comprises including metadata from the end customer application in the proof, and the logging the end customer application into the end customer account is further in response to the metadata provided in the third request matching the metadata from the end customer application.

Example 19. The non-transitory computer-readable medium of example 18, wherein the metadata comprises an Internet Protocol (IP) address and a user agent header of the end customer application.

Example 20. The non-transitory computer-readable medium of example 15, wherein the method further comprises:
- encrypting the proof with a private key of the cloud provider network to generate an encrypted proof, wherein the sending the proof by the cloud provider network to the end customer application is sending the encrypted proof; and
- decrypting the encrypted proof of the third request by the cloud provider network to generate a decrypted proof, wherein the logging the end customer application into the end customer account is in response to the decrypted proof from the third request being validated by the proof generated by the cloud provider network.

Exemplary environments, systems, etc. that the above may be used in are detailed below.

Figure 8:
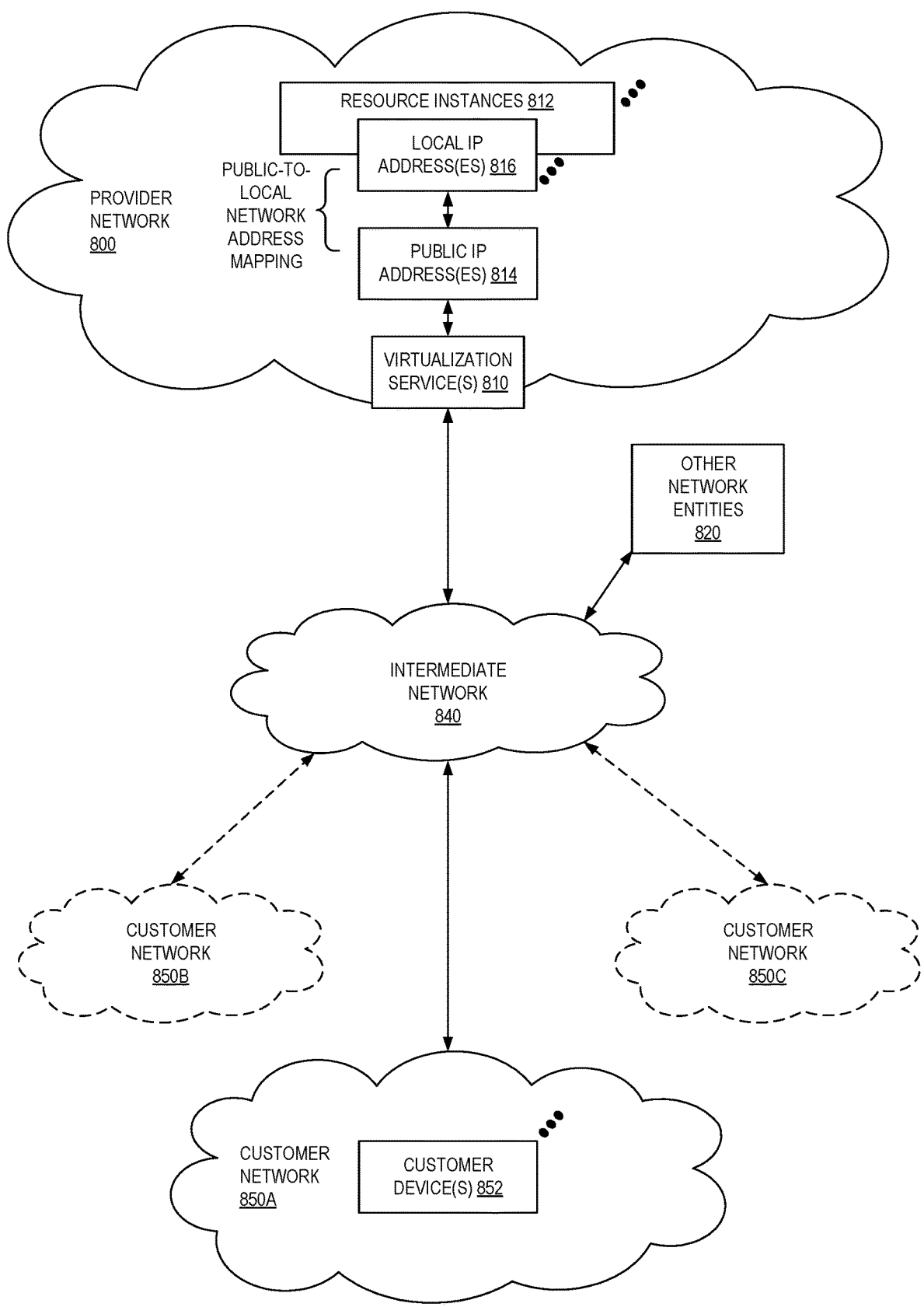
FIG. 8 illustrates an example provider network environment according to some examples.

FIG. 8 illustrates an example provider network (or "service provider system") environment according to some examples. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some examples, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
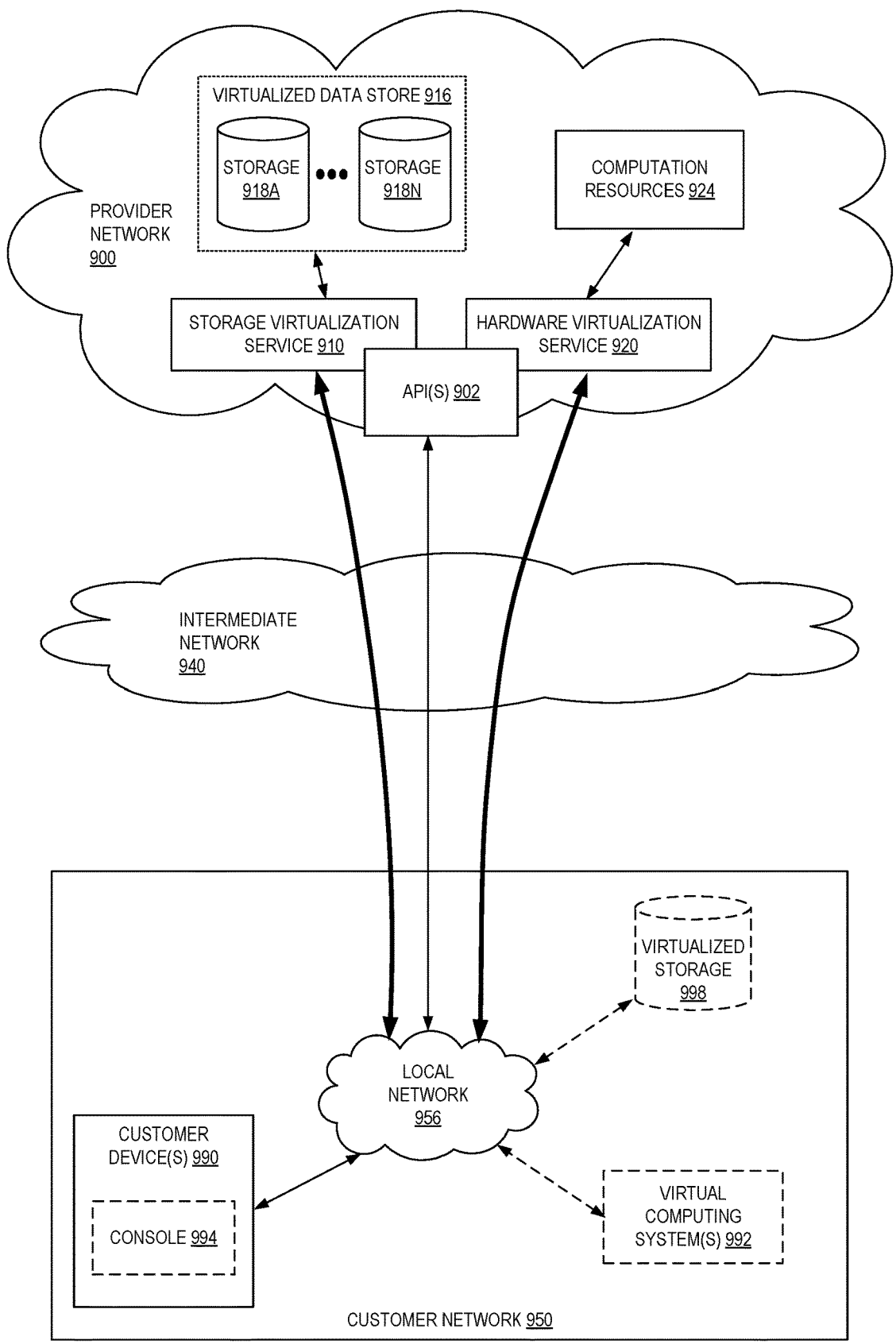
FIG. 9 is a block diagram of an example provider network that provides a storage service and a hardware virtualization service to customers according to some examples.

FIG. 9 is a block diagram of an example provider network that provides a storage service and a hardware virtualization service to customers, according to some examples. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some examples, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some examples, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some examples, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some examples, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
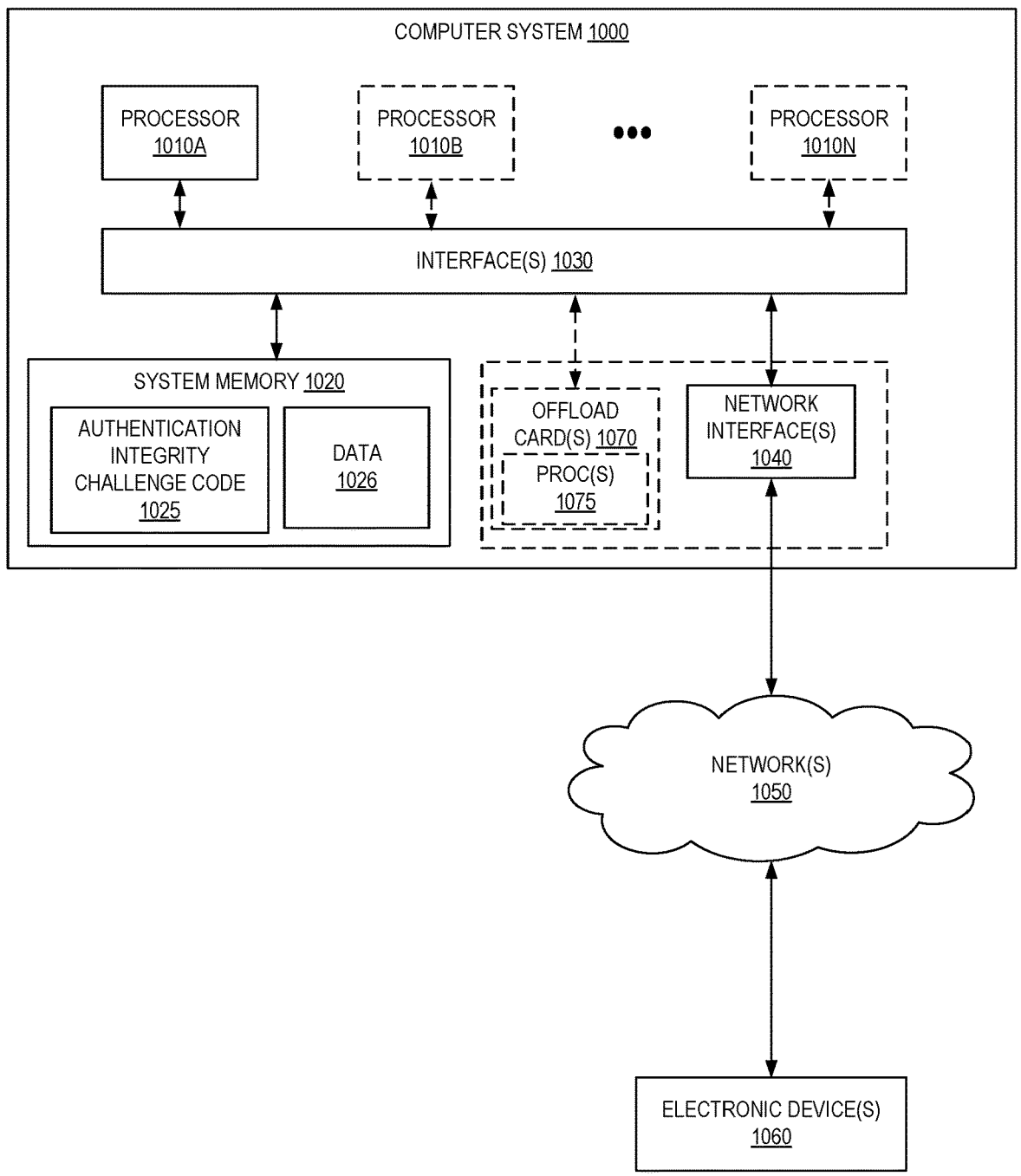
FIG. 10 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1000 illustrated in FIG. 10. In the illustrated example, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various examples a computer system 1000 may include one computing device or any number of computing devices configured to work together as a single computer system 1000.

In various examples, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various examples, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various examples, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1020 as authentication integrity challenge code 1025 (e.g., executable to implement, in whole or in part, one or more of the operations discussed herein) and data 1026.

In one example, I/O interface 1030 may be configured to coordinate I/O traffic between processor 1010, system memory 1020, and any peripheral devices in the device, including network interface 1040 or other peripheral interfaces. In some examples, I/O interface 1030 may perform any necessary protocol, timing, or other data transformations to convert data signals from one component (e.g., system memory 1020) into a format suitable for use by another component (e.g., processor 1010). In some examples, I/O interface 1030 may include support for devices attached through various types of peripheral buses, such as a variant of the Peripheral Component Interconnect (PCI) bus standard or the Universal Serial Bus (USB) standard, for example. In some examples, the function of I/O interface 1030 may be split into two or more separate components, such as a north bridge and a south bridge, for example. Also, in some examples some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various examples, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some examples the offload card(s) 1070 can perform compute instance management operations such as pausing and/or un-pausing compute instances, launching and/or terminating compute instances, performing memory transfer/copying operations, etc. These management operations may, in some examples, be performed by the offload card(s) 1070 in coordination with a hypervisor (e.g., upon a request from a hypervisor) that is executed by the other processors 1010A-1010N of the computer system 1000. However, in some examples the virtualization manager implemented by the offload card(s) 1070 can accommodate requests from other entities (e.g., from compute instances themselves), and may not coordinate with (or service) any separate hypervisor.

In some examples, system memory 1020 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
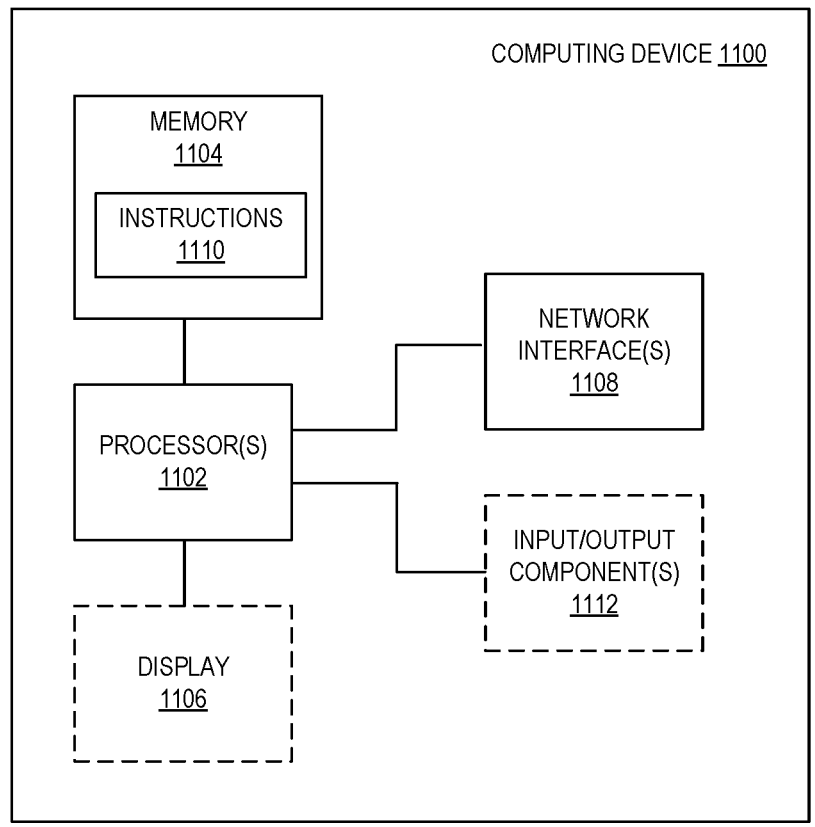
FIG. 11 illustrates a logical arrangement of a set of general components of an exemplary computing device that can be utilized in accordance with various examples.

FIG. 11 illustrates a logical arrangement of a set of general components of an example computing device 1100. Generally, a computing device 1100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1104) to store code (for example, instructions 1110, e.g., which implement a content delivery service as disclosed herein), and a set of one or more wired or wireless network interfaces 1108 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1104) of a given electronic device typically stores code (e.g., instructions 1110) for execution on the set of one or more processors 1102 of that electronic device. One or more parts of various examples may be implemented using different combinations of software, firmware, and/or hardware.

A computing device 1100 can include some type of display element 1106, such as a touch screen or liquid crystal display (LCD), although many devices such as portable media players might convey information via other means, such as through audio speakers, and other types of devices such as server end stations may not have a display element 1106 at all. As discussed, some computing devices used in some examples include at least one input and/or output component(s) 1112 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 12:
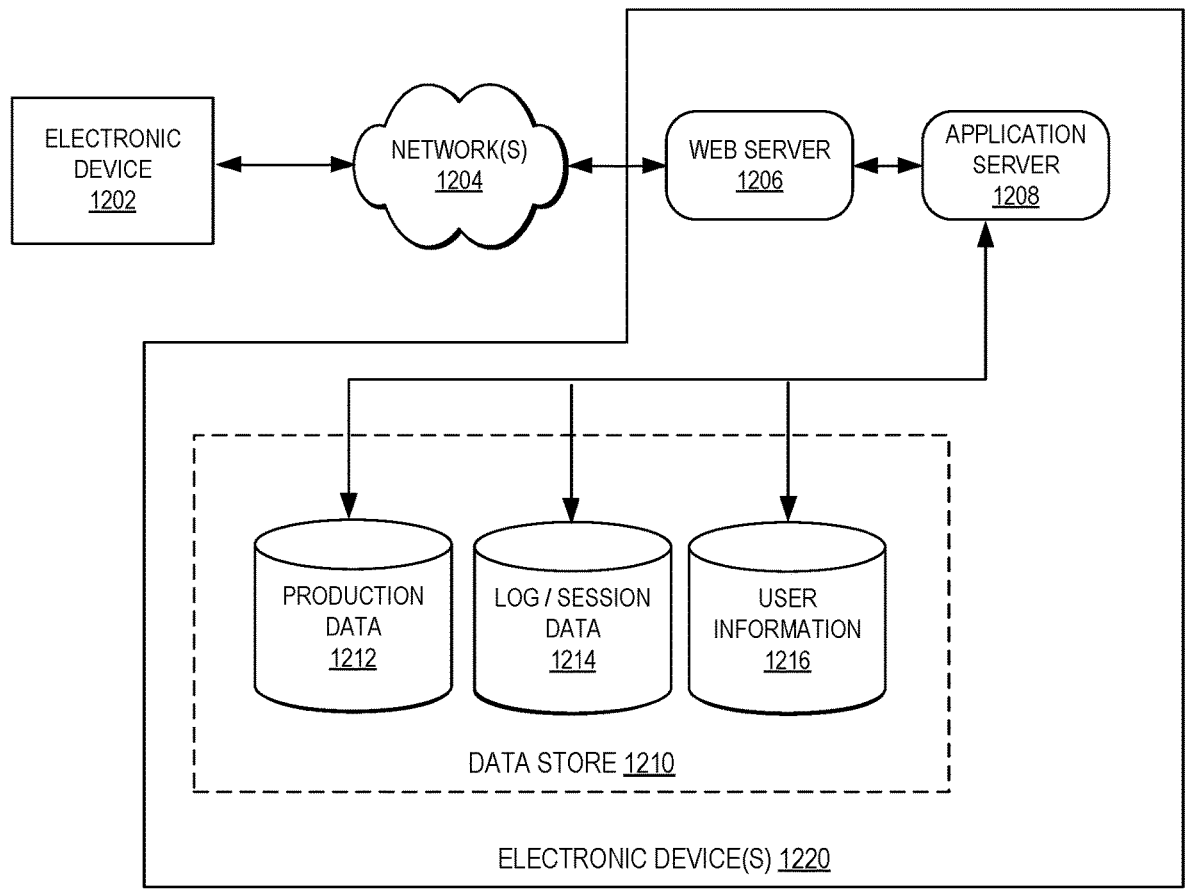
FIG. 12 illustrates an example of an environment for implementing aspects in accordance with various examples.

As discussed, different approaches can be implemented in various environments in accordance with the described examples. For example, FIG. 12 illustrates an example of an environment 1200 for implementing aspects in accordance with various examples. For example, in some examples messages are HyperText Transfer Protocol (HTTP) requests that are received by a web server (e.g., web server 1206), and the users, via electronic devices, may interact with the provider network via a web portal provided via the web server 1206 and application server 1208. As will be appreciated, although a web-based environment is used for purposes of explanation, different environments may be used, as appropriate, to implement various examples. The system includes an electronic client device 1202, which may also be referred to as a client device and can be any appropriate device operable to send and receive requests, messages, or information over an appropriate network 1204 and convey information back to a user of the device 1202. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1204 includes the Internet, as the environment includes a web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device 1202 and handling a majority of the data access and business logic for an application. The application server 1208 provides access control services in cooperation with the data store 1210 and is able to generate content such as text, graphics, audio, video, etc., to be transferred to the client device 1202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1202 and the application server 1208, can be handled by the web server 1206. It should be understood that the web server 1206 and application server 1208 are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store 1210 also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store 1210 might access the user information 1216 to verify the identity of the user and can access a production data 1212 to obtain information about items of that type. The information can then be returned to the user, such as in a listing of results on a web page that the user is able to view via a browser on the user device 1202. Information for a particular item of interest can be viewed in a dedicated page or window of the browser.

The web server 1206, application server 1208, and/or data store 1210 may be implemented by one or more electronic devices 1220, which can also be referred to as electronic server devices or server end stations, and may or may not be located in different geographic locations. Each of the one or more electronic devices 1220 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 918A-918N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at a cloud provider network, a first request from an end customer device to log into an end customer account of the cloud provider network;
sending, in response to the first request, a second request that does not include login credentials for the end customer account from the cloud provider network to a challenge provider service separate from the cloud provider network for the first request;

receiving, by the cloud provider network, a validation indication from the challenge provider service that indicates the second request is validated by an integrity challenge of the challenge provider service;
generating, by the cloud provider network, a proof based on the validation indication;
sending the proof by the cloud provider network to the end customer device;
receiving, by the cloud provider network, a third request from the end customer device that comprises the login credentials and the proof sent by the cloud provider network; and
logging the end customer device into the end customer account in response to the proof provided in the third request being validated by the proof generated by the cloud provider network and the login credentials provided in the third request matching corresponding login credentials for the end customer account.

2. The computer-implemented method of claim 1, further comprising deleting the proof from the cloud provider network in response to the proof provided in the third request being validated by the proof generated by the cloud provider network and not being validated by the proof generated by the cloud provider network.

3. The computer-implemented method of claim 1, wherein the generating, by the cloud provider network, the proof comprises including metadata from the end customer device in the proof, and the logging the end customer device into the end customer account is further in response to the metadata provided in the third request matching the metadata from the end customer device.

4. A computer-implemented method comprising:
receiving, at a cloud provider network, a first request from an end customer application to log into an end customer account of the cloud provider network;
sending, in response to the first request, a second request from the cloud provider network to a challenge provider service for the first request;
receiving, by the cloud provider network, a validation indication from the challenge provider service that indicates the second request is validated by an integrity challenge of the challenge provider service;
generating, by the cloud provider network, a proof based on the validation indication;
sending the proof by the cloud provider network to the end customer application;
receiving, by the cloud provider network, a third request from the end customer application that comprises login credentials and the proof sent by the cloud provider network; and
logging the end customer application into the end customer account in response to the proof provided in the third request being validated by the proof generated by the cloud provider network and the login credentials provided in the third request matching corresponding login credentials for the end customer account.

5. The computer-implemented method of claim 4, further comprising deleting the proof from the cloud provider network in response to the proof provided in the third request being validated by the proof generated by the cloud provider network.

6. The computer-implemented method of claim 5, further comprising deleting the proof from the cloud provider network in response to the proof provided in the third request not being validated by the proof generated by the cloud provider network.

7. The computer-implemented method of claim 4, further comprising deleting the proof from the cloud provider network in response to the proof provided in the third request not being validated by the proof generated by the cloud provider network.

8. The computer-implemented method of claim 4, wherein the generating, by the cloud provider network, the proof comprises including metadata from the end customer application in the proof, and the logging the end customer application into the end customer account is further in response to the metadata provided in the third request matching the metadata from the end customer application.

9. The computer-implemented method of claim 8, wherein the metadata comprises an Internet Protocol (IP) address of the end customer application.

10. The computer-implemented method of claim 9, wherein the metadata further comprises a user agent header of the end customer application.

11. The computer-implemented method of claim 8, wherein the metadata comprises a user agent header of the end customer application.

12. The computer-implemented method of claim 8, wherein the metadata comprises an expiration attribute and an issued-at time attribute for the first request from the end customer application.

13. The computer-implemented method of claim 4, further comprising encrypting the proof with a private key of the cloud provider network to generate an encrypted proof, wherein the sending the proof by the cloud provider network to the end customer application is sending the encrypted proof.

14. The computer-implemented method of claim 13, further comprising decrypting the encrypted proof of the third request by the cloud provider network to generate a decrypted proof, wherein the logging the end customer application into the end customer account is in response to the decrypted proof from the third request being validated by the proof generated by the cloud provider network.

15. A non-transitory computer-readable medium storing code that, when executed by a device, causes the device to perform a method comprising:
receiving, at a cloud provider network, a first request from an end customer application to log into an end customer account of the cloud provider network;
sending, in response to the first request, a second request from the cloud provider network to a challenge provider service for the first request;
receiving, by the cloud provider network, a validation indication from the challenge provider service that indicates the second request is validated by an integrity challenge of the challenge provider service;
generating, by the cloud provider network, a proof based on the validation indication;
sending the proof by the cloud provider network to the end customer application;
receiving, by the cloud provider network, a third request from the end customer application that comprises login credentials and the proof sent by the cloud provider network; and
logging the end customer application into the end customer account in response to the proof provided in the third request being validated by the proof generated by the cloud provider network and the login credentials provided in the third request matching corresponding login credentials for the end customer account.

16. The non-transitory computer-readable medium of claim 15, wherein the method further comprises deleting the proof from the cloud provider network in response to the proof provided in the third request being validated by the proof generated by the cloud provider network.

17. The non-transitory computer-readable medium of claim 16, wherein the method further comprises deleting the proof from the cloud provider network in response to the proof provided in the third request not being validated by the proof generated by the cloud provider network.

18. The non-transitory computer-readable medium of claim 15, wherein the generating, by the cloud provider network, the proof comprises including metadata from the end customer application in the proof, and the logging the end customer application into the end customer account is further in response to the metadata provided in the third request matching the metadata from the end customer application.

19. The non-transitory computer-readable medium of claim 18, wherein the metadata comprises an Internet Protocol (IP) address and a user agent header of the end customer application.

20. The non-transitory computer-readable medium of claim 15, wherein the method further comprises:
- encrypting the proof with a private key of the cloud provider network to generate an encrypted proof, wherein the sending the proof by the cloud provider network to the end customer application is sending the encrypted proof; and
- decrypting the encrypted proof of the third request by the cloud provider network to generate a decrypted proof, wherein the logging the end customer application into the end customer account is in response to the decrypted proof from the third request being validated by the proof generated by the cloud provider network.

* * * * *